(12) United States Patent
Kono et al.

(10) Patent No.: US 11,577,186 B2
(45) Date of Patent: Feb. 14, 2023

(54) ACTIVE FILTER SYSTEM AND AIR CONDITIONING DEVICE

(71) Applicant: DAIKIN INDUSTRIES, LTD., Osaka (JP)

(72) Inventors: Masaki Kono, Osaka (JP); Reiji Kawashima, Osaka (JP); Takayuki Fujita, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/619,566

(22) PCT Filed: Jul. 18, 2018

(86) PCT No.: PCT/JP2018/026865
§ 371 (c)(1),
(2) Date: Dec. 5, 2019

(87) PCT Pub. No.: WO2019/017373
PCT Pub. Date: Jan. 24, 2019

(65) Prior Publication Data
US 2020/0129896 A1    Apr. 30, 2020

(30) Foreign Application Priority Data

Jul. 18, 2017    (JP) .............................. JP2017-139331

(51) Int. Cl.
*F24F 8/10*    (2021.01)
*B01D 35/06*    (2006.01)
(Continued)

(52) U.S. Cl.
CPC ................ *B01D 35/06* (2013.01); *F24F 8/10* (2021.01); *F24F 8/192* (2021.01); *F24F 11/46* (2018.01);
(Continued)

(58) Field of Classification Search
CPC .... H02M 3/158; H02M 1/4208; H02M 5/293; Y02E 40/12; Y02E 40/30; Y02E 40/22; Y02E 40/40
See application file for complete search history.

(56) References Cited

U.S. PATENT DOCUMENTS 4,812,669 A * 3/1989 Takeda .................. H02M 1/084
  307/105
5,825,162 A * 10/1998 Kida ..................... H02J 3/1807
  323/210

(Continued)

FOREIGN PATENT DOCUMENTS

CN    204696691 U    10/2015
EP    2 424 066 A2    2/2012
(Continued)

OTHER PUBLICATIONS

International Search Report, issued in PCT/JP2018/026865, PCT/ISA/210, dated Sep. 18, 2018.
(Continued)

*Primary Examiner* — Bryan R Perez
(74) *Attorney, Agent, or Firm* — Birch, Stewart, Kolasch & Birch, LLP

(57) ABSTRACT

A plurality of active filter devices (41, 42, 43) that each have an output connected to a harmonic-generating load device (2) and are capable of generating a compensating current for performing at least one of reduction of a harmonic current of the harmonic-generating load device (2) and improvement of the power factor of the fundamental wave are provided. The plurality of active filter devices (41, 42, 43) provide two or more types of capacities, and the number and combination of operating active filter devices among the active filter devices (41, 42, 43) change in accordance with the magnitude of the compensating current.

6 Claims, 13 Drawing Sheets

(51) Int. Cl.
*F24F 11/46* (2018.01)
*F24F 8/192* (2021.01)
*F24F 140/60* (2018.01)
*F24F 140/50* (2018.01)
*H02M 1/15* (2006.01)

(52) U.S. Cl.
CPC ....... *F24F 2140/50* (2018.01); *F24F 2140/60* (2018.01); *H02M 1/15* (2013.01)

(56) References Cited

U.S. PATENT DOCUMENTS

| | | | |
|---|---|---|---|
| 7,099,165 B1 | 8/2006 | Rozman | |
| 7,613,018 B2 * | 11/2009 | Lim | H02M 5/4585 363/34 |
| 8,847,562 B2 * | 9/2014 | Agudo Araque | H02J 3/1842 323/210 |
| 2005/0035815 A1 * | 2/2005 | Cheng | H02M 1/15 327/552 |
| 2014/0184315 A1 * | 7/2014 | Wallace | H02M 1/15 327/532 |
| 2015/0035467 A1 * | 2/2015 | MacLennan | H02M 1/126 318/503 |

FOREIGN PATENT DOCUMENTS

| | | | |
|---|---|---|---|
| JP | 7-135736 A | | 5/1995 |
| JP | 10341532 A | * | 12/1998 |
| JP | 2000-236628 A | | 8/2000 |
| JP | 2013-070513 A | | 4/2013 |

OTHER PUBLICATIONS

Bhattacharya et al. "Active Filter System Implementation", IEEE Industry Applications Magazine, IEEE Service Center, Piscataway, NJ, US; vol. 4, No. 5, Sep. 1, 1998, pp. 47-63, XP-000848885.

Extended European Search report dated Dec. 11, 2020 in corresponding European Patent Office.

* cited by examiner

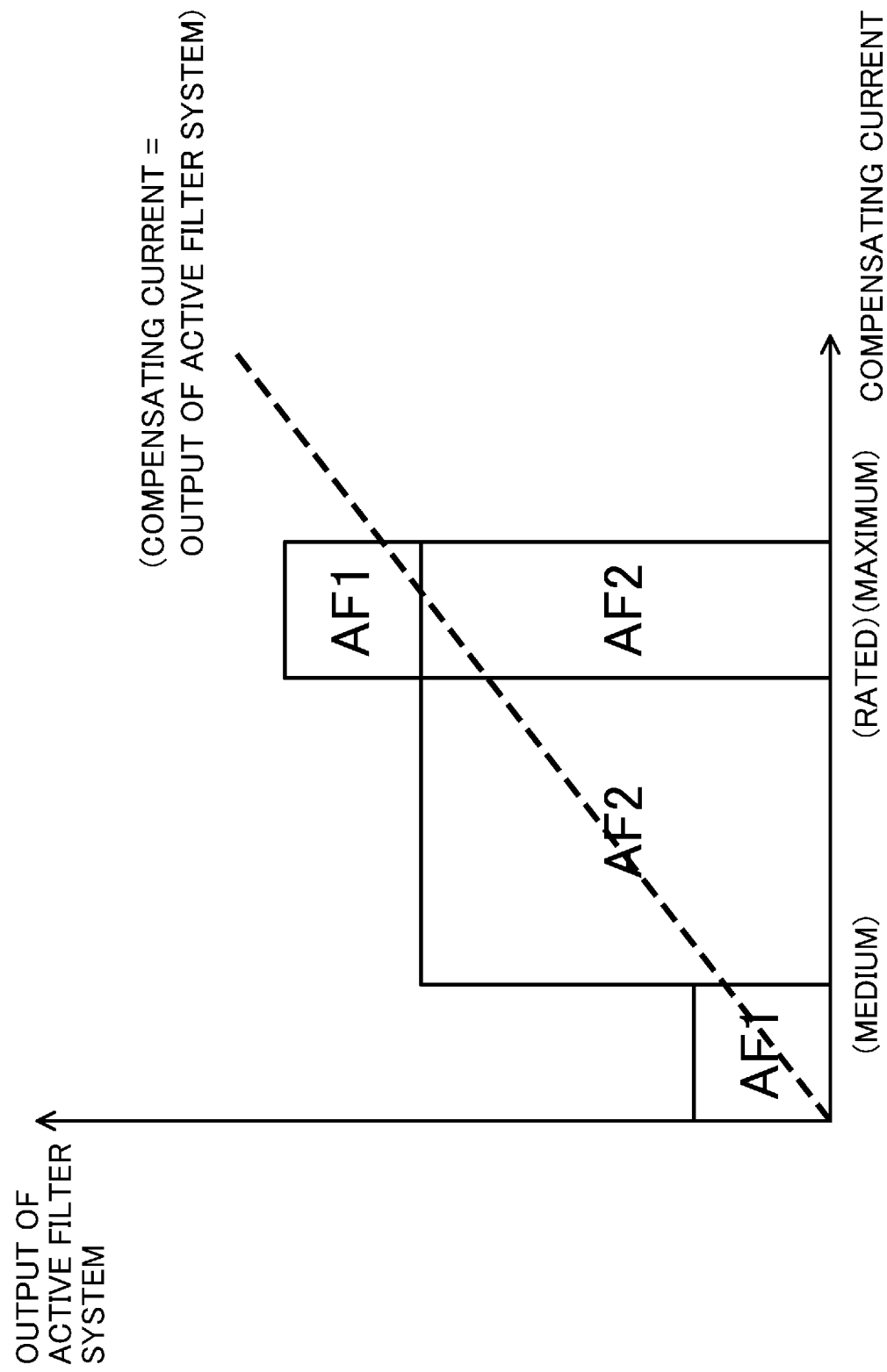

ACTIVE FILTER SYSTEM AND AIR CONDITIONING DEVICE

TECHNICAL FIELD

The present invention relates to an active filter system and an air conditioning device.

BACKGROUND ART

In factories, buildings, and so on, a large number of large power conversion devices (for example, large inverter devices) are installed as power sources for, for example, electric motors. Such large power conversion devices generate a harmonic current, and therefore, in order to lessen the adverse effect of the harmonic current on the electric power system, active filter devices may be installed in the buildings and so on (see, for example, PTL 1). In the example described in this patent literature, a plurality of active filter devices provide, to the electric power system, a harmonic current having a phase opposite to that of the load current, thereby reducing the harmonic current in the electric power system.

CITATION LIST

Patent Literature

PTL 1: Japanese Unexamined Patent Application Publication No. 7-135736

SUMMARY OF INVENTION

Technical Problem

However, in a case where, for example, the plurality of active filter devices are equally responsible for output, it is difficult to efficiently operate the active filter devices. This is because a power conversion switching element used in an active filter device is generally designed to operate with the highest efficiency in a case where the maximum allowable current is provided, and therefore, in the case where the plurality of active filter devices are only equally responsible for output, the possibility of each active filter device operating at a low-efficiency operation point increases.

The present invention has been made in view of the above-described problem, and an object thereof is to increase the efficiency of an active filter system including a plurality of active filter devices at a low cost.

Solution to Problem

To solve the above-described problem, a first aspect is an active filter system including a plurality of active filter devices (41, 42, 43) that each have an output connected to a harmonic-generating load device (2) and are capable of generating a compensating current for performing at least one of reduction of a harmonic current of the harmonic-generating load device (2) and improvement of a power factor of a fundamental wave, in which the plurality of active filter devices (41, 42, 43) provide two or more types of capacities, and the number and a combination of operating active filter devices among the active filter devices (41, 42, 43) change in accordance with a magnitude of the compensating current.

With this configuration, the total capacity of the operating active filter devices is changed in accordance with the magnitude of the compensating current while a combination of different capacities is provided.

A second aspect is the active filter system according to the first aspect in which the number and the combination of the operating active filter devices among the active filter devices (41, 42, 43) change so as to maximize a ratio of the compensating current relative to a total capacity of the operating active filter devices among the active filter devices (41, 42, 43).

With this configuration, active filter devices providing a minimum necessary total capacity are operated among the active filter devices (41, 42, 43) providing two or more types of capacities to generate the compensating current.

A third aspect is the active filter system according to the second aspect in which an active filter device having a large capacity among the active filter devices (41, 42, 43) is preferentially operated.

With this configuration, from among the combinations of active filter devices providing the minimum necessary total capacity, a combination of the smallest number of operating active filter devices is selected.

A fourth aspect is the active filter system according to the second or third aspect in which when the compensating current exceeds or falls below a value of the compensating current corresponding to a total capacity of any combination among all combinations for selecting one or more active filter devices from among the plurality of active filter devices (41, 42, 43), the combination of the operating active filter devices among the active filter devices (41, 42, 43) changes.

With this configuration, the timing at which the combination of active filter devices is changed is determined on the basis of the magnitude of the compensating current.

A fifth aspect is the active filter system according to any of the second to fourth aspects in which instead of capacities of the respective active filter devices (41, 42, 43), an output at which the active filter devices (41, 42, 43) reach a maximum efficiency is used.

With this configuration, a combination with which the efficiency of the active filter devices is high is selected.

A sixth aspect is the active filter system according to any of the first to fifth aspects in which the harmonic-generating load device (2) is a power conversion device.

A seventh aspect is an air conditioning device including the active filter system according to any of the first to sixth aspects.

Advantageous Effects of Invention

According to the first aspect, the active filter devices providing two or more types of capacities are used. Accordingly, it is possible to realize an active filter system for which the capacity is changeable with a comparable scale and with a smaller number of active filter devices than in a case of using active filter devices having the same capacity.

According to the second aspect, active filter devices that provide the minimum necessary total capacity are operated. Accordingly, it is possible to operate the active filter system in a more efficient state than in a case where all of the active filter devices are equally responsible for the compensating current.

According to the third aspect, the number of operating active filter devices is minimized. Accordingly, it is possible to reduce a loss that continuously occurs regardless of the magnitude of output and to operate the active filter system in a more efficient state.

According to the fourth aspect, it is possible to easily set the timing at which the combination of operating active filter devices is changed.

According to the fifth aspect, the incidence of a period during which the active filter devices are used with an efficiency close to the maximum efficiency increases. Accordingly, it is possible to operate the active filter system in a more efficient state.

According to the sixth aspect, it is possible to achieve the above-described effects in the active filter system that is connected to the power conversion device.

According to the seventh aspect, it is possible to achieve the above-described effects in the air conditioning device including the active filter system.

BRIEF DESCRIPTION OF DRAWINGS

FIG. 13 illustrates a modification of combinations of active filter devices.

DESCRIPTION OF EMBODIMENTS

Hereinafter, embodiments of the present invention will be described with reference to the drawings. Note that the following embodiments are essentially preferred embodiments and are not intended to limit the scope of the present invention, things to which the present invention is applicable, or the field of application of the present invention.

First Embodiment of the Present Invention

Figure 1:
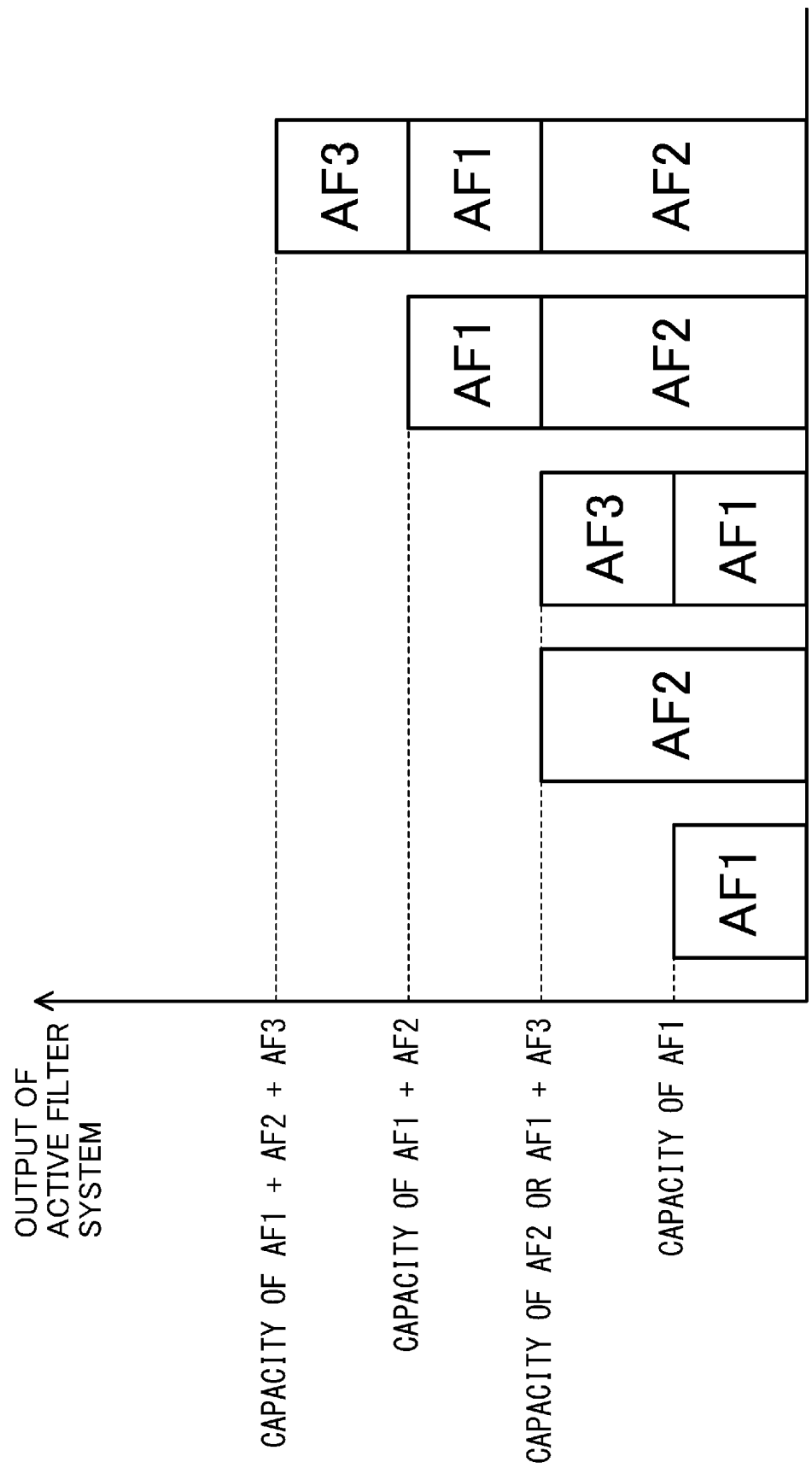
FIG. 1 illustrates example capacities of active filters in a first embodiment.

FIG. 1 illustrates example combinations of active filters in a first embodiment of the present invention. In this example, three active filter devices AF1, AF2, and AF3 are present.

Regarding the capacities of the respective active filter devices, the capacity of AF1 and the capacity of AF3 are equal to each other, and the capacity of AF2 is equal to the sum of the capacity of AF1 and the capacity of AF3. When one or more active filter devices are selected from among the three active filter devices and combined to realize an active filter system, the active filter system can provide four types of capacities in total.

Figure 2:
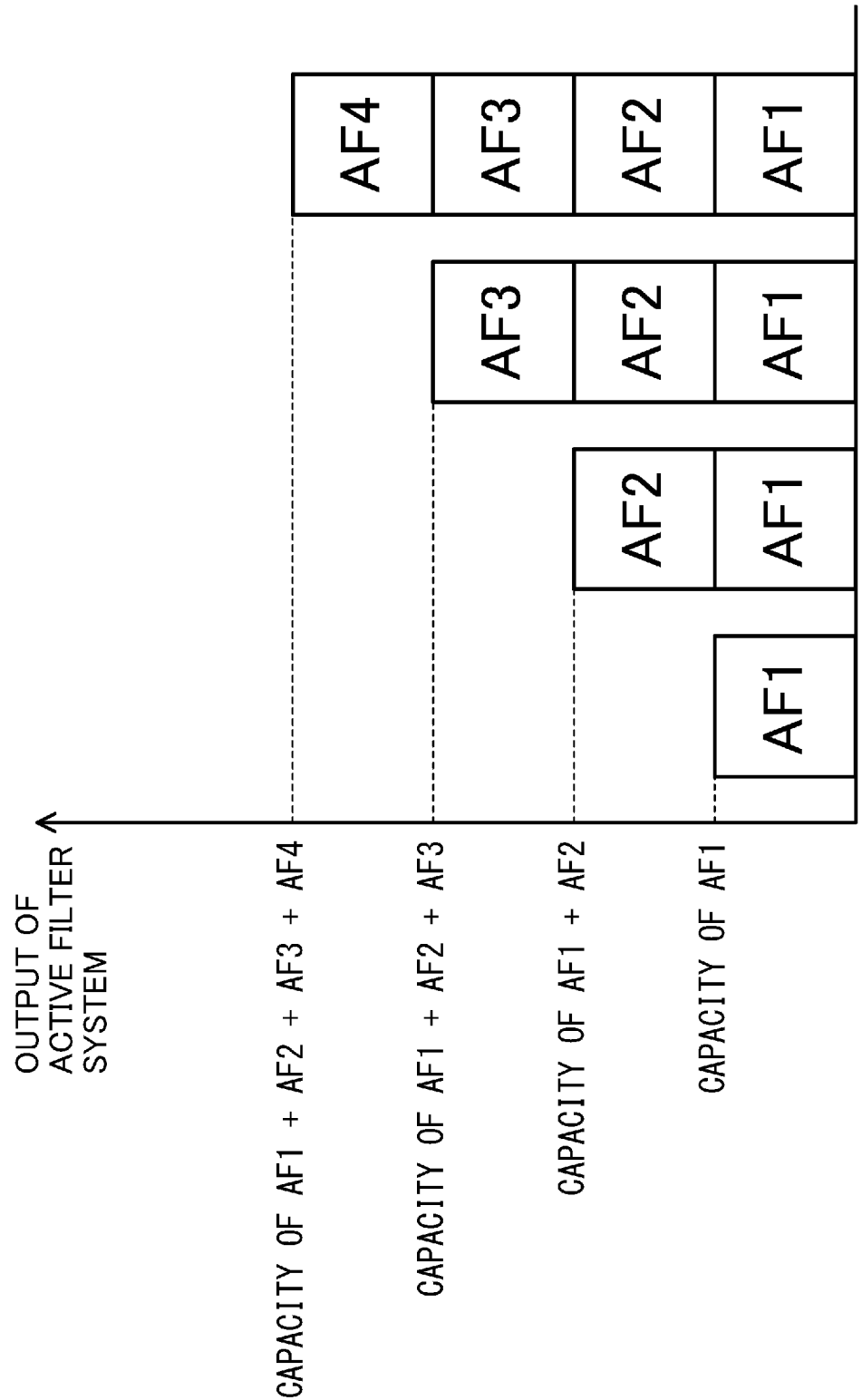
FIG. 2 illustrates example capacities of an active filter system in a case of a plurality of active filter devices having the same capacity.

On the other hand, FIG. 2 illustrates combinations of active filter devices having the same capacity. To realize the active filter system that provides four types of capacities as illustrated in FIG. 1, four active filter devices (AF1, AF2, AF3, and AF4) having a capacity the same as that of AF1 and AF3 in FIG. 1 are necessary.

Effects of this Embodiment

When active filter devices that provide two types of capacities are used, it is possible to realize an active filter system for which the capacity is changeable with a comparable scale and with a smaller number of active filter devices than in a case of using active filter devices having the same capacity for a harmonic-generating load device having a wide range of power capacity. For example, in a case where the cost of one active filter device is lower than the cost of two active filter devices having the same capacity and the capacity of the one active filter device is twice the capacity of each of the two active filter devices, it is possible to reduce the total cost of the active filter system.

Second Embodiment of the Present Invention

Figure 3:
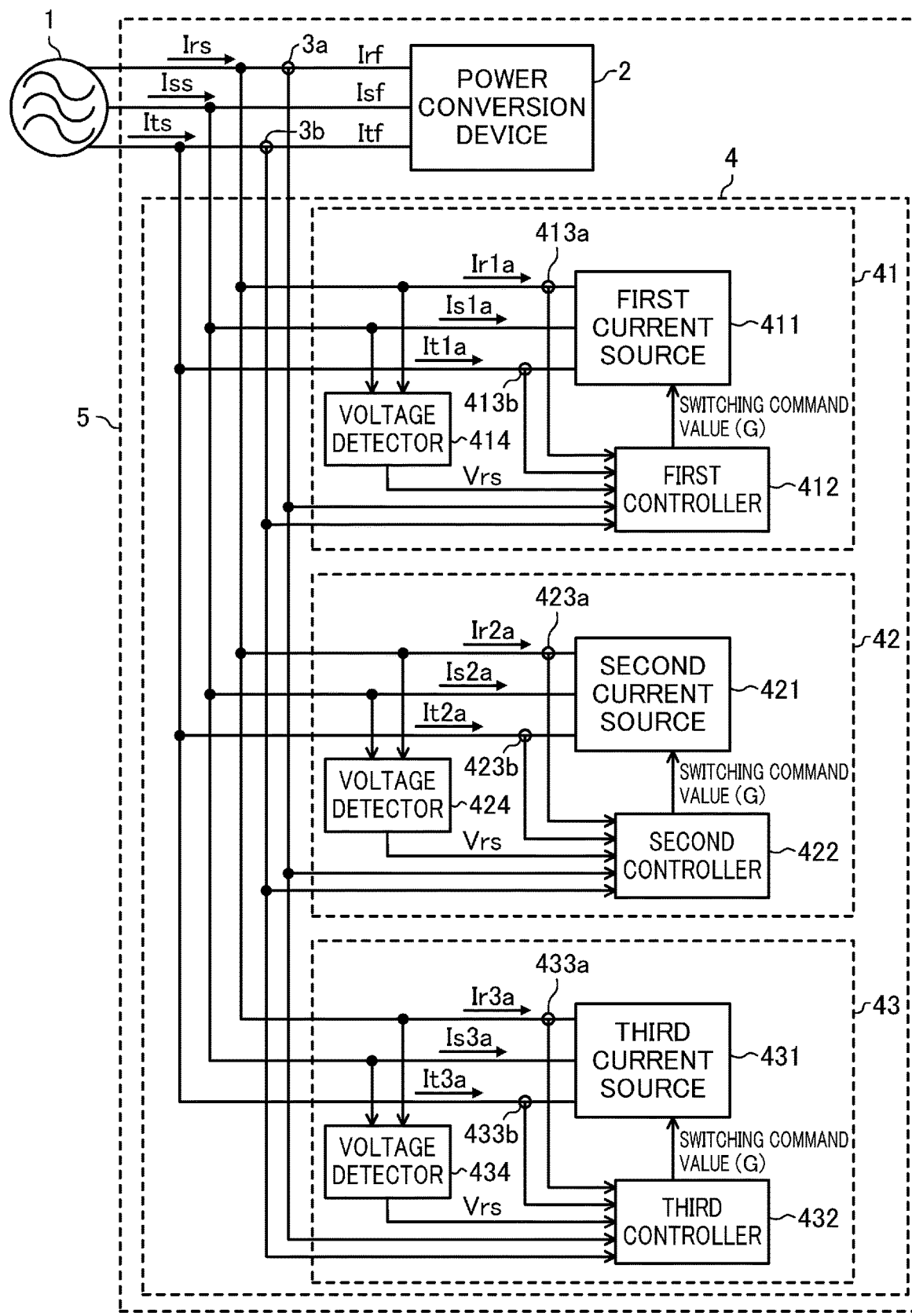
FIG. 3 is a block diagram illustrating an air conditioning device according to a second embodiment.

FIG. 3 is a block diagram illustrating an air conditioning device (5) according to a second embodiment of the present invention. The air conditioning device (5) is installed in an apartment, a factory, a building, a detached house, or the like (hereinafter referred to as a building or the like) and performs indoor air conditioning (cooling and heating). To a building or the like in which the air conditioning device (5) is installed, power is supplied from an electric power system that includes an AC power source (1). In this example, the AC power source (1) is a three-phase AC power source (for example, a three-phase commercial power source).

<Air Conditioning Device (5)>

The air conditioning device (5) includes a refrigerant circuit (not illustrated) having a compressor, a power conversion device (2), and an active filter system (4). The power conversion device (2) is connected to the AC power source (1) and is supplied with AC power. The power conversion device (2) has a converter circuit and an inverter circuit (which are not illustrated). The AC power supplied to the power conversion device (2) is converted to AC power having a desired frequency and a desired voltage by the inverter circuit and so on in the power conversion device (2) and supplied to the compressor (more specifically, to an electric motor included in the compressor). Accordingly, the compressor operates, the refrigerant circuit works, and as a consequence, indoor air conditioning is performed.

When the power conversion device (2) and the electric motor of the compressor operate in the air conditioning device (5), a harmonic current may be generated. For example, in the inverter circuit included in the power conversion device (2), a switching operation is performed by a switching element. At this time, a harmonic current is generated. That is, the power conversion device (2) is an example of the harmonic-generating load device of the present invention. This harmonic current may flow out to the AC power source (1) via a power receiving path through which power is supplied from the AC power source (1) to the air conditioning device (5). In general, the level of outflow of such a harmonic current to the AC power source (1) is regulated, and the air conditioning device (5) reduces the flowing-out harmonic current with the active filter system (4). From the viewpoints of facility capacity and energy conservation, there is a demand for improving the power factor of the fundamental wave at a power distribution end and a power receiving end. For this, the active filter system (4) of this embodiment also has a function of improving the power factor of the fundamental wave. The configuration of the active filter system (4) is described below.

<Active Filter System (4)>

The active filter system (4) includes a first active filter device (41), a second active filter device (42), and a third active filter device (43) and is built in the air conditioning device (5). The first to third active filter devices (41, 42, 43) are housed in a common casing. The active filter devices (41, 42, 43) have a function of outputting a current for canceling a harmonic current generated by the power conversion device (2) and appearing on the power receiving path. That is, the active filter devices (41, 42, 43) provide a current (hereinafter called a compensating current) so that the current on the power receiving path that connects the AC power source (1) and the power conversion device (2) comes closer to a sine wave. More specifically, the active filter devices (41, 42, 43) detect a harmonic current appearing on the power receiving path that connects the AC power source (1) and the air conditioning device (5) and generate and supply to the power receiving path of the air conditioning device (5) a compensating current having a phase opposite to that of the detected harmonic current.

It is considered that the harmonic current generated in the air conditioning device (5) becomes largest in a case where the load on the air conditioning device (5) is largest (for example, at the time of maximum output in a heating operation). Accordingly, the capacities (the magnitudes of power that can be output) of the active filter devices (41, 42, 43) are set by taking into consideration the harmonic current appearing at the time of the maximum load on the air conditioning device (5).

In the air conditioning device (5) of this embodiment, the active filter devices (41, 42, 43) provide two types of capacities. Two active filter devices among the three active filter devices (41, 42, 43) are designed to have a capacity so as to be usable for the medium load of air conditioning, and the remaining one active filter device is designed to have a capacity so as to be usable for a load twice the medium load. This embodiment assumes that the rated load is three times the medium load and that the difference between the maximum load and the rated load is equal to or smaller than the medium load. Accordingly, in a case where all of the active filter devices (41, 42, 43) are controlled in a maximum output state, it is possible to cancel a harmonic current at the time of the maximum load on the air conditioning device (5). Further, the active filter devices (41, 42, 43) have the function of improving the power factor of the fundamental wave. Specifically, the active filter devices (41, 42, 43) are configured so as to provide a compensating current that also compensates for a reactive component of the fundamental wave, thereby improving the power factor of the fundamental wave.

To realize the above-described functions of the active filter devices (41, 42, 43), the first active filter device (41) includes a first current source (411), a first controller (412), a voltage detector (414), and two current detectors (413a, 413b), as illustrated in FIG. 3. The second active filter device (42) includes a second current source (421), a second controller (422), a voltage detector (424), and two current detectors (423a, 423b). The third active filter device (43) includes a third current source (431), a third controller (432), a voltage detector (434), and two current detectors (433a, 433b).

The voltage detectors (414, 424, 434) each detect the voltage (source voltage (Vrs)) of the AC power source (1). The two current detectors (413a, 413b) respectively detect currents (Ir1a, It1a) input to the first active filter device (41). The two current detectors (423a, 423b) respectively detect currents (Ir2a, It2a) input to the second active filter device (42). The two current detectors (433a, 433b) respectively detect currents (Ir3a, It3a) input to the third active filter device (43). FIG. 3 illustrates the example where the active filter devices (41, 42, 43) are provided with the current detectors (413a, 413b, 423a, 423b, 433a, 433b) for two phases; however, a configuration in which current detectors are placed for three respective phases to detect currents in the three phases may be employed.

The air conditioning device (5) is also provided with current detectors (3a, 3b). Specifically, the current detectors (3a, 3b) are provided on the power receiving path that connects the power conversion device (2), which is the harmonic-generating load device, and the AC power source (1) and detect the values of currents (hereinafter referred to as load currents (Irf, Itf)) flowing into the power conversion device (2). The configuration of the current detectors (3a, 3b) are not limited and, for example, a current transformer may be employed. The values detected by the current detectors (3a, 3b) are transmitted to all of the first controller (412), the second controller (422), and the third controller (432). The current detectors (3a, 3b) may be configured to transmit the detected values to the controllers (412, 422, 432) with a wired method or may be configured to transmit the detected values with a wireless method.

In a case where the current detectors (3a, 3b) are configured to transmit the detected values to the controllers (412, 422, 432) with a wireless method, wiring work can be reduced. A phenomenon in which magnetic flux that crosses the current detectors (3a, 3b) changes relative to the time due to the currents flowing through the current detectors is called electromagnetic induction. In the case of employing a wireless method, induced electromotive force that is electromotive force generated by the electromagnetic induction may be used as a power source for driving the current detectors. As a consequence, it is possible to configure the current detectors (3a, 3b) without wires and without a power source, which produces an effect, that is, time and effort for work can be reduced.

Current Sources (411, 421, 431)

The first to third current sources (411, 421, 431) are each specifically formed of an inverter circuit. The first to third current sources (411, 421, 431) generate a current (namely, a compensating current) for reducing the harmonic current and improving the power factor of the fundamental wave. To control generation of the compensating current by the first current source (411), a switching command value (G) described below is input to the first current source (411) from the first controller (412). Similarly, the switching command value (G) is input to the second current source (421) from the second controller (422). Further, the switching command value (G) is input to the third current source (431) from the third controller (432). In each of the current sources (411, 421, 431), a switching element of the inverter circuit performs a switching operation in accordance with the switching command value (G) to generate the compensating current. The output terminal of each of the current sources (411, 421, 431) is connected to the power receiving path of the power conversion device (2), and the generated compensating current is output to the power receiving path.

First Controller (412)

Figure 4:
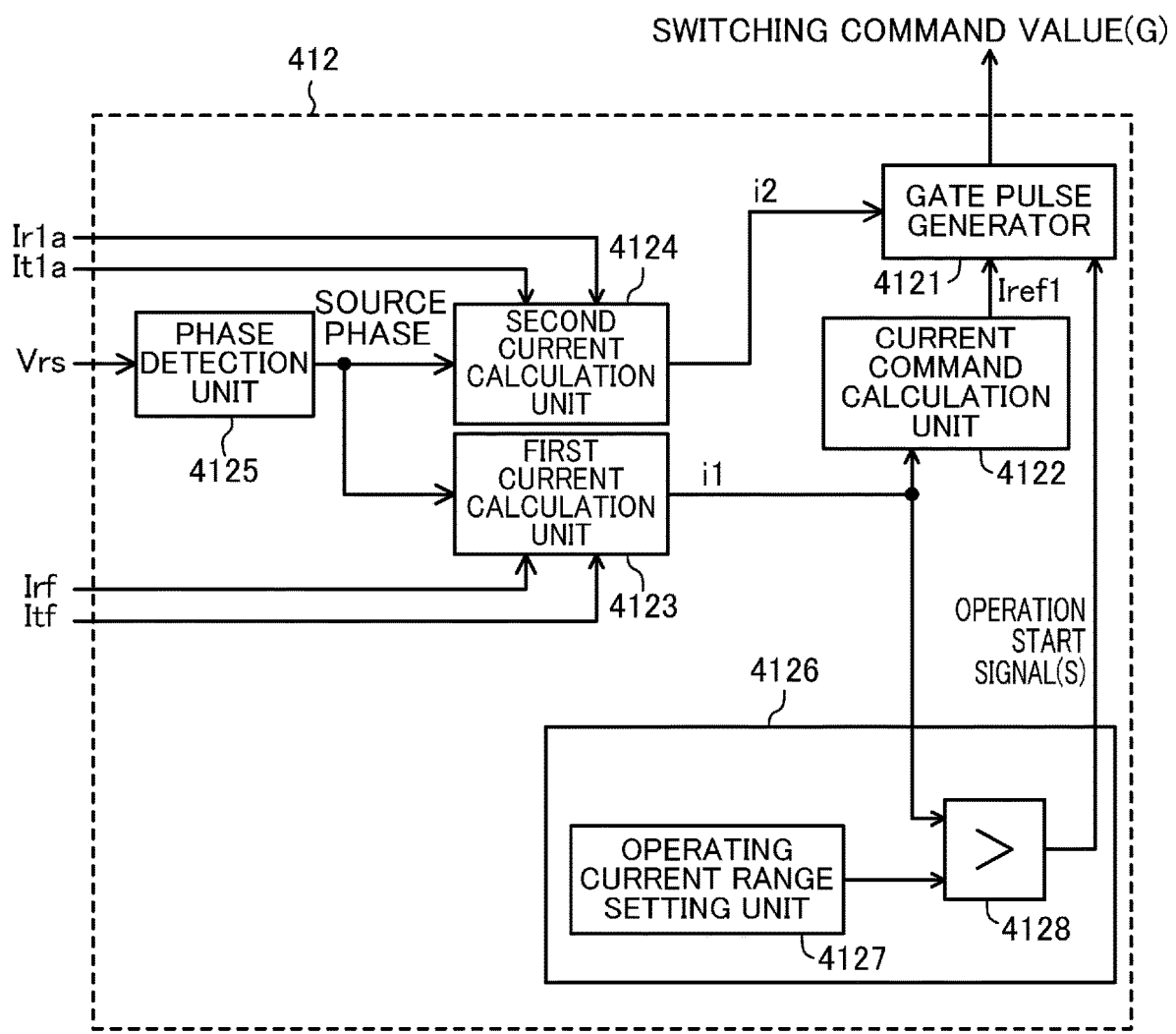
FIG. 4 is a block diagram illustrating an example configuration of a first controller according to the second embodiment.

FIG. 4 is a block diagram illustrating an example configuration of the first controller (412). The first controller (412) controls the output current from the first current source (411). In this example, the first controller (412) includes a gate pulse generator (4121), a current command calculation unit (4122), a first current calculation unit (4123), a second current calculation unit (4124), a phase detection unit (4125), and an operation determination unit (4126). The first controller (412) can be formed by using, for example, a microcomputer and a memory device that stores a program for operating the microcomputer.

The phase detection unit (4125) detects the phase of the source voltage (Vrs) on the power receiving path. The phase detection unit (4125) transmits the obtained source phase to the first current calculation unit (4123) and the second current calculation unit (4124).

To the first current calculation unit (4123), the load currents (Irf, Itf) detected by the current detectors (3a, 3b) are input. On the basis of the load currents (Irf, Itf) and the source phase detected by the phase detection unit (4125), the first current calculation unit (4123) calculates a current (referred to as a first current value (i1)) necessary for performing both compensation for the harmonic current on the power receiving path that connects the AC power source (1) and the power conversion device (2) (reduction of the harmonic current) and compensation for a reactive component of the fundamental wave (improvement of the power factor of the fundamental wave), and outputs the first current value (i1) to the current command calculation unit (4122).

To the second current calculation unit (4124), the currents (Ir1a, It1a) detected by the current detectors (413a, 413b) are input. The currents (Ir1a, It1a) are currents input to the first active filter device (41). On the basis of the currents (Ir1a, It1a) and the source phase detected by the phase detection unit (4125), the second current calculation unit (4124) calculates a second current value (i2). The second current value (i2) corresponds to a current that flows into the first active filter device (41) at this point in time in a case of performing both compensation for the harmonic current (reduction of the harmonic current) and compensation for a reactive component of the fundamental wave (improvement of the power factor of the fundamental wave). The second current calculation unit (4124) calculates the second current value (i2) for each phase. The second current calculation unit (4124) outputs the second current value (i2) to the gate pulse generator (4121) for each phase.

The current command calculation unit (4122) calculates a current having a phase opposite to that of the first current value (i1) and outputs the value of the current to the gate pulse generator (4121) as a current command value (Iref1).

Figure 7:
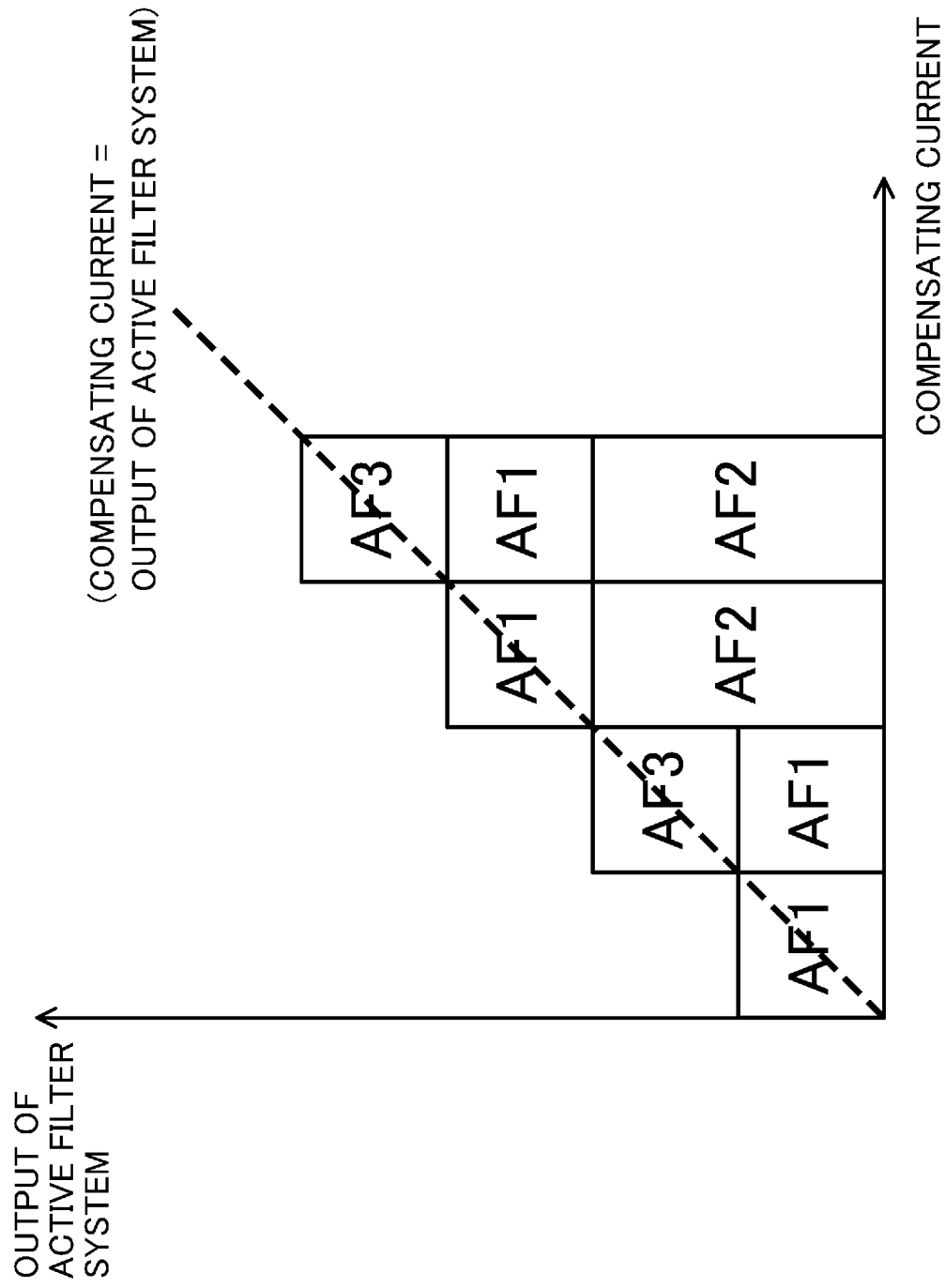
FIG. 7 illustrates example combinations of active filter devices in the second embodiment.

The operation determination unit (4126) includes an operating current range setting unit (4127) and a comparator (4128). The operation determination unit (4126) determines whether to operate the first current source (411) on the basis of the first current value (i1). In this example, the operation determination unit (4126) is configured to output to the gate pulse generator (4121) an operation start signal (S) for allowing the first current source (411) to operate in a case where the first current value (i1) is within a predetermined operating current range. In this embodiment, the operating current range corresponds to all values of the load currents (Irf, Itf). The operating current range is set in the operating current range setting unit (4127). For example, as illustrated in FIG. 7, the first active filter device (41) is set so as to operate for all compensating current values. The compensating current value is the first current value (i1) calculated on the basis of the load currents (Irf, Itf). In the operation determination unit (4126), the operating current range and the first current value (i1) are compared by the comparator (4128). When the value of the first current value (i1) is within the operating current range, the operation start signal (S) is output to the gate pulse generator (4121) from the comparator (4128).

FIG. 7 illustrates combinations of the active filter devices in this embodiment, and AF1, AF2, and AF3 respectively correspond to the first active filter device (41), the second active filter device (42), and the third active filter device (43). In FIG. 7, for the compensating current, an active filter device that is operated and the capacity thereof are illustrated as a region. When the compensating current is within the capacity, it is possible to output the necessary compensating current. For a plurality of active filter devices, the capacities thereof are illustrated in a stacked manner, and the top of the regions corresponds to the total capacity of the active filter devices that are in operation. An active filter device that is not illustrated in the figure for the compensating current is in a suspend state.

The gate pulse generator (4121) generates and outputs to the first current source (411) the switching command value (G) so that the current value (the second current value (i2)) that is output from the first current source (411) matches the current command value (Iref1). The switching command value (G) is for giving an instruction for switching in the inverter circuit that constitutes the first current source (411). In this embodiment, the gate pulse generator (4121) performs feedback control in which an operation of generating the switching command value (G) on the basis of the error between the output current value (the second current value (i2)) of the first current source (411) and the current command value (Iref1) is repeated. Accordingly, a current (compensating current) that corresponds to the current command value (Iref1) is supplied to the power receiving path from the first current source (411).

—Second Controller (422)—

Figure 5:
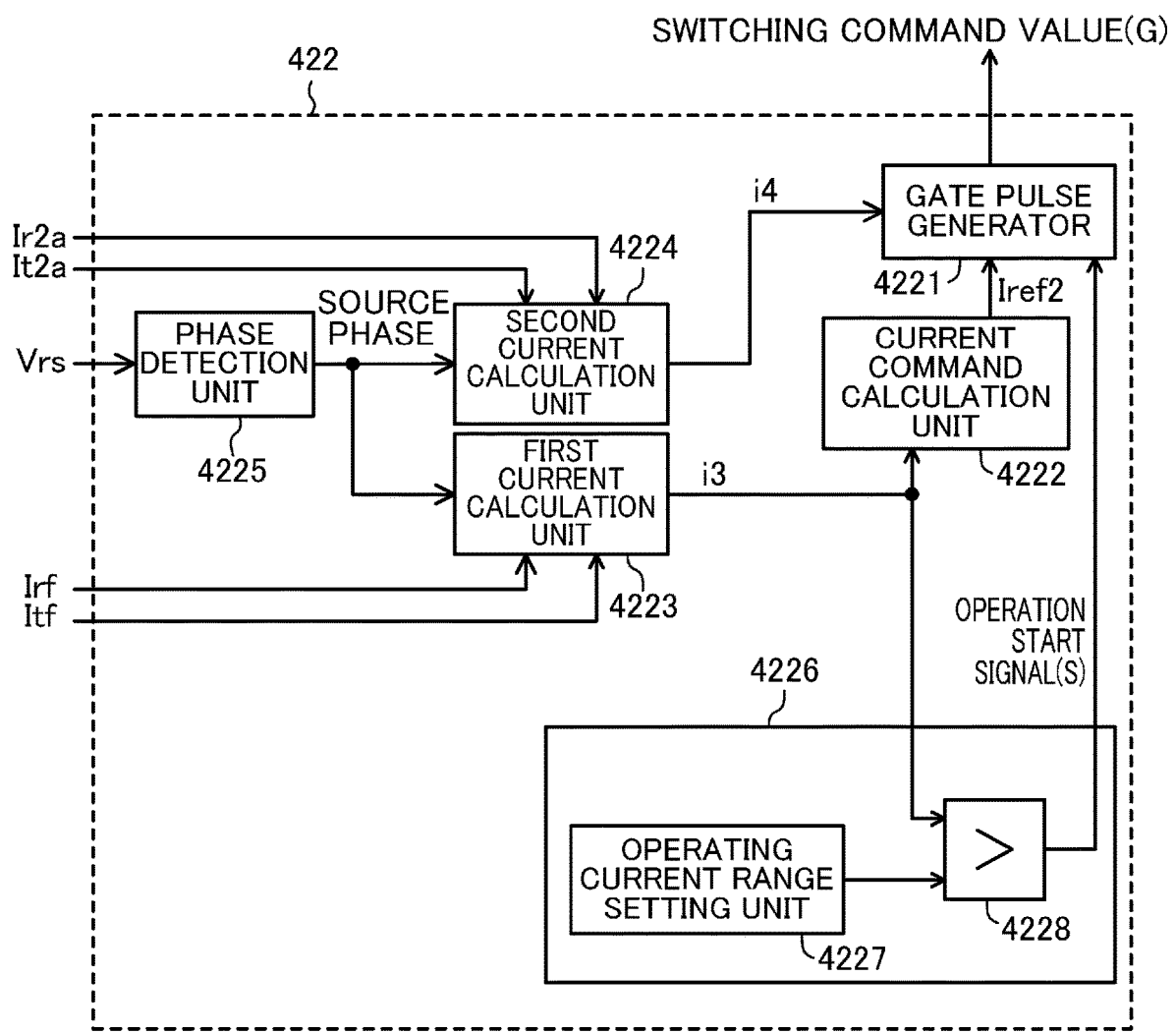
FIG. 5 is a block diagram illustrating an example configuration of a second controller according to the second embodiment.

FIG. 5 is a block diagram illustrating an example configuration of the second controller (422). The second controller (422) controls the output current from the second current source (421). In this example, the second controller (422) includes a gate pulse generator (4221), a current command calculation unit (4222), a first current calculation unit (4223), a second current calculation unit (4224), a phase detection unit (4225), and an operation determination unit (4226). The second controller (422) can also be formed by using, for example, a microcomputer and a memory device that stores a program for operating the microcomputer.

The phase detection unit (4225) detects the phase of the source voltage (Vrs) on the power receiving path. The phase detection unit (4225) transmits the source phase to the first current calculation unit (4223) and the second current calculation unit (4224).

To the first current calculation unit (4223), the load currents (Irf, Itf) detected by the current detectors (3a, 3b) are input. On the basis of the load currents (Irf, Itf) and the source phase detected by the phase detection unit (4225), the first current calculation unit (4223) calculates a current (referred to as a third current value (i3)) necessary for performing both compensation for the harmonic current on the power receiving path that connects the AC power source (1) and the power conversion device (2) (reduction of the harmonic current) and compensation for a reactive component of the fundamental wave (improvement of the power factor of the fundamental wave), and outputs the third current value (i3) to the current command calculation unit (4222) and the operation determination unit (4226).

To the second current calculation unit (4224), the currents (Ir2a, It2a) detected by the current detectors (423a, 423b) are input. The currents (Ir2a, It2a) are currents input to the second active filter device (42). On the basis of the currents (Ir2a, It2a) and the source phase detected by the phase detection unit (4225), the second current calculation unit (4224) calculates a fourth current value (i4). The fourth current value (i4) is a current that flows into the second active filter device (42) at this point in time in the case of performing both compensation for the harmonic current (reduction of the harmonic current) and compensation for a reactive component of the fundamental wave (improvement of the power factor of the fundamental wave). The second current calculation unit (4224) calculates the fourth current value (i4) for each phase. The second current calculation unit (4224) outputs the fourth current value (i4) to the gate pulse generator (4221) for each phase.

The current command calculation unit (4222) calculates a current having a phase opposite to that of the third current value (i3) and outputs the value of the current to the gate pulse generator (4221) as a current command value (Iref2).

The operation determination unit (4226) includes an operating current range setting unit (4227) and a comparator (4228). The operation determination unit (4226) determines whether to operate the second current source (421) on the basis of the third current value (i3). In this example, the operation determination unit (4226) is configured to output to the gate pulse generator (4221) the operation start signal (S) for allowing the second current source (421) to operate in a case where the third current value (i3) is within a predetermined operating current range. In this embodiment, the operating current range corresponds to values of the load currents (Irf, Itf) larger than a value twice the medium load of air conditioning. The operating current range is set in the operating current range setting unit (4227). For example, as illustrated in FIG. 7, the second active filter device (42) is set so as to operate in a case where the compensating current that exceeds the total capacity of the first active filter device (41) and the third active filter device (43) is necessary. The compensating current is the third current value (i3) calculated on the basis of the load currents (Irf, Itf). In the operation determination unit (4226), the operating current range and the third current value (i3) are compared by the comparator (4228). When the value of the third current value (i3) is within the operating current range, the operation start signal (S) is output to the gate pulse generator (4221) from the comparator (4228).

In a case where the operation start signal (S) is input from the operation determination unit (4226), the gate pulse generator (4221) generates and outputs to the second current source (421) the switching command value (G) so that the fourth current value (i4) for each phase that is input to the second active filter device (42) matches the current command value (Iref2). The switching command value (G) is for giving an instruction for switching in the inverter circuit that constitutes the second current source (421). In this embodiment, the gate pulse generator (4221) performs feedback control in which an operation of generating the switching command value (G) on the basis of the error between the output current value (the fourth current value (i4)) of the second current source (421) and the current command value (Iref2) is repeated. Accordingly, a current (compensating current) that corresponds to the current command value (Iref2) is supplied to the power receiving path from the second current source (421).

—Third Controller (432)—

Figure 6:
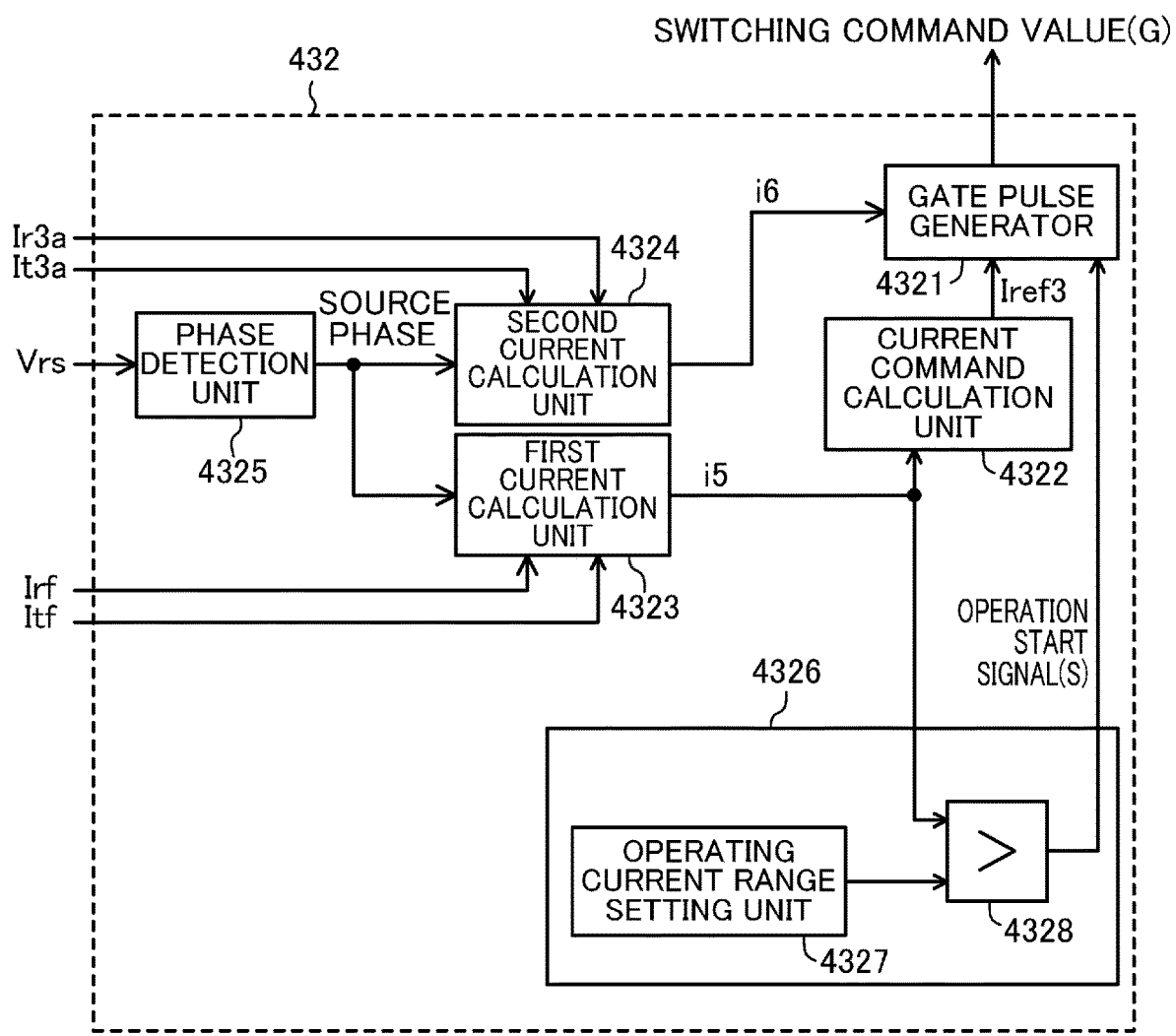
FIG. 6 is a block diagram illustrating an example configuration of a third controller according to the second embodiment.

FIG. 6 is a block diagram illustrating an example configuration of the third controller (432). The third controller (432) controls the output current from the third current source (431). In this example, the third controller (432) includes a gate pulse generator (4321), a current command calculation unit (4322), a first current calculation unit (4323), a second current calculation unit (4324), a phase detection unit (4325), and an operation determination unit (4326). The third controller (432) can also be formed by using, for example, a microcomputer and a memory device that stores a program for operating the microcomputer.

The phase detection unit (4325) detects the phase of the source voltage (Vrs) on the power receiving path. The phase detection unit (4325) transmits the source phase to the first current calculation unit (4323) and the second current calculation unit (4324).

To the first current calculation unit (4323), the load currents (Irf, Itf) detected by the current detectors (3a, 3b) are input. On the basis of the load currents (Irf, Itf) and the source phase detected by the phase detection unit (4325), the first current calculation unit (4323) calculates a current (referred to as a fifth current value (i5)) necessary for performing both compensation for the harmonic current on the power receiving path that connects the AC power source (1) and the power conversion device (2) (reduction of the harmonic current) and compensation for a reactive component of the fundamental wave (improvement of the power factor of the fundamental wave), and outputs the fifth current value (i5) to the current command calculation unit (4322) and the operation determination unit (4326).

To the second current calculation unit (4324), the currents (Ir3a, It3a) detected by the current detectors (433a, 433b) are input. The currents (Ir3a, It3a) are currents input to the third active filter device (43). On the basis of the currents (Ir3a, It3a) and the source phase detected by the phase detection unit (4325), the second current calculation unit (4324) calculates a sixth current value (i6). The sixth current value (i6) is a current that flows into the third active filter device (43) at this point in time in the case of performing both compensation for the harmonic current (reduction of the harmonic current) and compensation for a reactive component of the fundamental wave (improvement of the power factor of the fundamental wave). The second current calculation unit (4324) calculates the sixth current value (i6) for each phase. The second current calculation unit (4324) outputs the sixth current value (i6) to the gate pulse generator (4321) for each phase.

The current command calculation unit (4322) calculates a current having a phase opposite to that of the fifth current value (i5) and outputs the value of the current to the gate pulse generator (4321) as a current command value (Iref3).

The operation determination unit (4326) includes an operating current range setting unit (4327) and a comparator (4328). The operation determination unit (4326) determines whether to operate the third current source (431) on the basis of the fifth current value (i5). In this example, the operation determination unit (4326) is configured to output to the gate pulse generator (4321) the operation start signal (S) for allowing the third current source (431) to operate in a case where the fifth current value (i5) is within a predetermined operating current range. In this embodiment, the operating current range corresponds to compensating current values corresponding to the load currents (Irf, Itf) ranging from the medium load of air conditioning to a load twice the medium load, and to compensating current values corresponding to the load currents (Irf, Itf) ranging from the rated load to the maximum load. The operating current range is set in the operating current range setting unit (4327). For example, as illustrated in FIG. 7, the third active filter device (43) is set so as to operate in a range from the compensating current that exceeds the capacity of the first active filter device (41) to the compensating current corresponding to the total capacity of the first active filter device (41) and the third active filter device (43) and in a range of the compensating current that exceeds the total capacity of the first active filter device (41) and the second active filter device (42). The compensating current is the fifth current value (i5) calculated on the basis of the load currents (Irf, Itf). In the operation determination unit (4326), the operating current range and the fifth current value (i5) are compared by the comparator (4328). When the value of the fifth current value (i5) is within the operating current range, the operation start signal (S) is output to the gate pulse generator (4321) from the comparator (4328).

In a case where the operation start signal (S) is input from the operation determination unit (4326), the gate pulse generator (4321) generates and outputs to the third current source (431) the switching command value (G) so that the sixth current value (i6) for each phase that is input to the third active filter device (43) matches the current command value (Iref3). The switching command value (G) is for giving an instruction for switching in the inverter circuit that constitutes the third current source (431). In this embodiment, the gate pulse generator (4321) performs feedback control in which an operation of generating the switching command value (G) on the basis of the error between the output current value (the sixth current value (i6)) of the third current source (431) and the current command value (Iref3) is repeated. Accordingly, a current (compensating current) that corresponds to the current command value (Iref3) is supplied to the power receiving path from the third current source (431).

This embodiment assumes that the operating current ranges of the active filter devices (41, 42, 43) are respectively set in advance in the operating current range setting units (4127, 4227, 4327). However, after the active filter system (4) is turned on, the active filter devices (41, 42, 43) may communicate with one another to determine the operating current ranges on the basis of the respective capacities. As the method for communication, for example, a serial communication method that is generally used in communication between the devices in the air conditioning device (5) may be used.

<Operations of Air Conditioning Device (5)>

When the air conditioning device (5) is activated, the controllers (412, 422, 432) of the active filter devices (41, 42, 43) also start operating. Accordingly, in the first active filter device (41), the first current calculation unit (4123) calculates the first current value (i1) and the second current calculation unit (4124) calculates the second current value (i2). When the second current value (i2) is calculated, a compensating current is output from the first current source (411) of the first active filter device (41). That is, the first active filter device (41) enters an operating state.

At this time, for example, in a case where the load on the air conditioning device (5) is smaller than the medium load, the load currents (Irf, Itf) are small, and the value of the third current value (i3) calculated by the first current calculation unit (4223) of the second controller (422) is outside the operating current range of the second active filter device. Therefore, in the second active filter device (42), the operation start signal (S) is not output from the operation determination unit (4226). Accordingly, a compensating current is not output from the second current source (421) of the second active filter device (42). That is, the second active filter device (42) is in a suspend state.

Similarly, the value of the fifth current value (i5) calculated by the first current calculation unit (4323) of the third controller (432) is outside the operating current range of the third active filter device. Therefore, in the third active filter device (43), the operation start signal (S) is not output from the operation determination unit (4326). Accordingly, a compensating current is not output from the third current source (431) of the third active filter device (43). That is, the third active filter device (43) is also in the suspend state.

When the load on the air conditioning device (5) becomes larger than the medium load, the first active filter device (41) enters a maximum output state. At this time, in the third active filter device (43), the value of the fifth current value (i5) calculated by the first current calculation unit (4323) of the third controller (432) becomes within the operating current range of the third active filter device (43). Accordingly, the operation start signal (S) is output from the operation determination unit (4326), and a compensating current is output from the third current source (431) of the third active filter device (43). That is, the third active filter device (43) transitions from the suspend state to the operating state.

When the load on the air conditioning device (5) becomes larger than a load twice the medium load, both the first active filter device (41) and the third active filter device (43) enter the maximum output state. At this time, in the second active filter device (42), the value of the third current value (i3) calculated by the first current calculation unit (4223) of the second controller (422) becomes within the operating current range of the second active filter device. Accordingly, the operation start signal (S) is output from the operation determination unit (4226), and a compensating current is output from the second current source (421) of the second active filter device (42). That is, the second active filter device (42) transitions from the suspend state to the operating state. At the same time, in the third active filter device (43), the value of the fifth current value (i5) calculated by the first current calculation unit (4323) of the third controller (432) becomes outside the operating current range of the third active filter device (43). Accordingly, the operation start signal (S) is not output from the operation determination unit (4326) any more, and a compensating current is not output from the third current source (431) of the third active filter device (43) any more. That is, the third active filter device (43) transitions from the operating state to the suspend state.

When the load on the air conditioning device (5) becomes larger than the rated load, both the first active filter device (41) and the second active filter device (42) enter the maximum output state. At this time, in the third active filter device (43), the value of the fifth current value (i5) calculated by the first current calculation unit (4323) of the third controller (432) becomes within the operating current range of the third active filter device. Accordingly, the operation start signal (S) is output from the operation determination unit (4326), and a compensating current is output from the third current source (431) of the third active filter device (43). That is, the third active filter device (43) transitions from the suspend state to the operating state. Accordingly, all of the active filter devices (41, 42, 43) enter the operating state for a load ranging from the rated load to the maximum load.

When the active filter system (4) thus operates, an appropriate compensating current is output, and a harmonic component included in the current provided to the power conversion device (2) and the compensating current cancel each other in the air conditioning device (5). Accordingly, the current provided from the AC power source (1) becomes a sine wave as a result of removal of the harmonic current, and the power factor is also improved.

As described above, in this embodiment, the plurality of (in this example, three) active filter devices (41, 42, 43) having different capacities are used in the air conditioning device (5), and the combination of the active filter devices (41, 42, 43) is changed so as to maximize the ratio of the compensating current relative to the total capacity of the operating active filter devices.

Effects of this Embodiment

In this embodiment, the active filter devices (41, 42, 43) are combined so as to maximize the ratio of the compensating current relative to the total capacity of the operating active filter devices (41, 42, 43). The possibility of the active filter devices (41, 42, 43) in operation being used with the maximum current or a current having a magnitude close to the maximum current becomes higher than in a case where the active filter devices (41, 42, 43) are only equally responsible for the compensating current. In general, a switching element that constitutes a current source is designed to operate with the highest efficiency in a case where the maximum allowable current is provided. Therefore, in a case where the number of operating active filter devices and the total capacity are combined so that the active filter devices (41, 42, 43) that are in operation are used with the maximum current or a current having a magnitude close to the maximum current, it is possible to operate the active filter system (4) in a more efficient state than in a case of equally operating the three active filter devices (41, 42, 43).

Third Embodiment of the Present Invention

Figure 8:
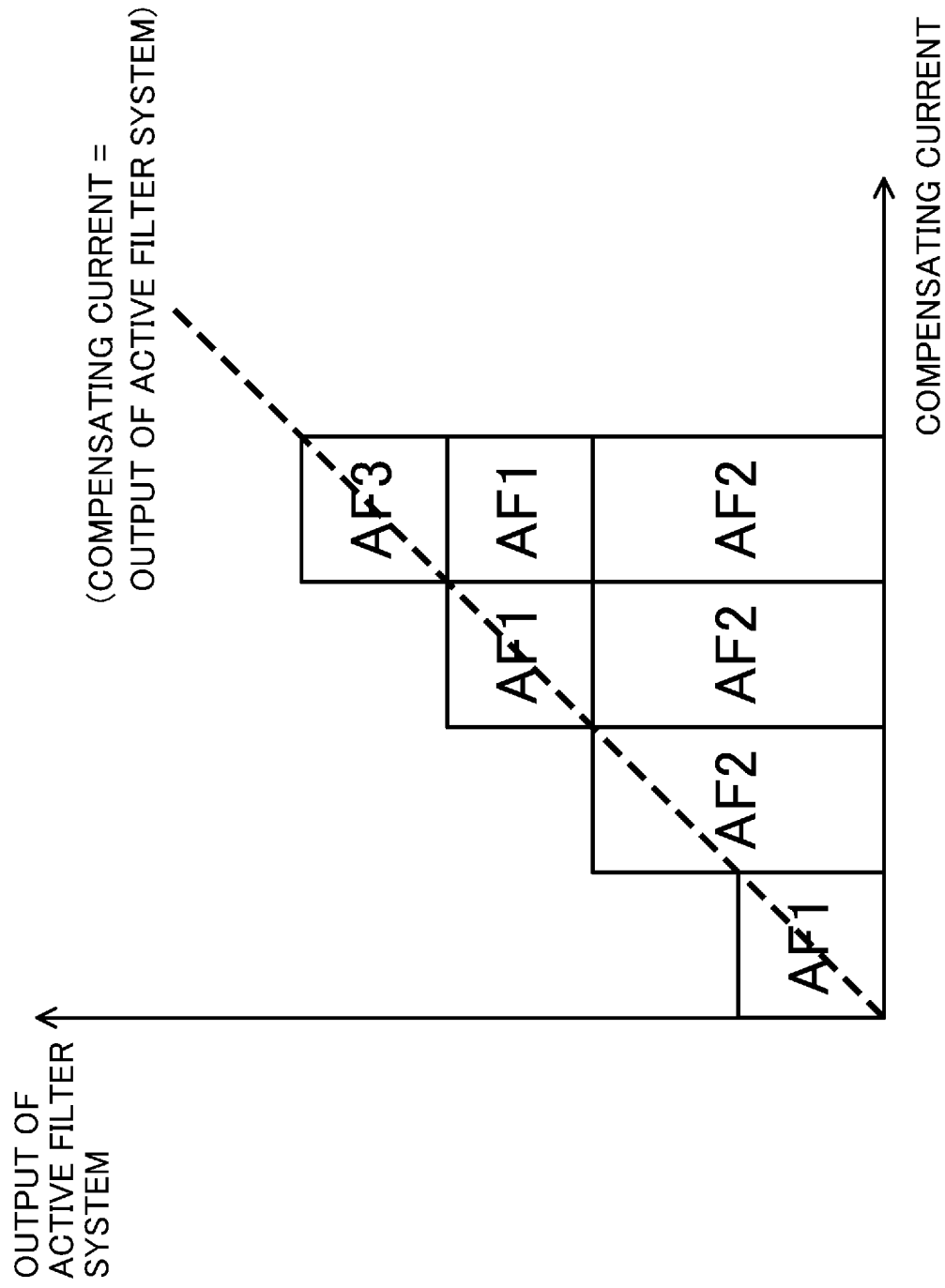
FIG. 8 illustrates example combinations of active filter devices in a third embodiment.

In a third embodiment of the present invention, an example where the number of operating active filter devices among the active filter devices (41, 42, 43) is smallest is described. FIG. 8 illustrates example combinations of the active filter devices in this embodiment.

When the load on the air conditioning device (5) becomes larger than the medium load, options are available. One of the options is to operate the third active filter device (43), and the other option is to operate the second active filter device (42) and suspend the first active filter device (41). At this time, the following relationship holds: {capacity of first active filter device (41)}<{capacity of second active filter device (42)}≤{total capacity of first active filter device (41) and third active filter device (43)}. Therefore, to maximize the ratio of the compensating current relative to the total capacity of the operating active filter devices and to minimize the number of operating active filter devices, it is necessary to operate the second active filter device (42) and suspend the first active filter device (41).

The result of selecting a combination of operating active filter devices on the basis of a similar idea is illustrated in FIG. 8. Compared to the example in FIG. 7, it is found that an active filter device having a larger capacity is preferentially operated in a current range in which options of a plurality of combinations are available.

Effects of this Embodiment

In this embodiment, for the necessary compensating current, the ratio of the compensating current relative to the total capacity of operating active filter devices is maximized and the number of operating active filter devices is minimized. Therefore, it is possible to operate the active filter system in a more efficient state. In the active filter devices, some power, such as power consumed by a control circuit, is continuously consumed during operation regardless of the magnitude of output. Such power consumption increases as the number of operating active filter devices increases. Therefore, the power consumption can be reduced by minimizing the number of operating active filter devices.

Fourth Embodiment of the Present Invention

In a fourth embodiment of the present invention, an example timing at which operating active filter devices among the active filter devices (41, 42, 43) and the combination thereof change is described.

As illustrated in FIG. 1, in a case where the three active filter devices that provide two types of capacities are used, it is possible to provide four types of total capacities by all combinations. At the timing when the necessary compensating current exceeds or falls below the compensating current that corresponds to any of the four types of total capacities or the load current, the combination is changed. It is also possible to estimate the timing by checking the increase-decrease state of the load.

Effects of this Embodiment

When the capacities of the respective active filter devices are known, a compensating current value or a load current value for which the combination of operating active filter devices is to be changed is determined. Therefore, it is possible to easily set the timing at which the combination is to be changed.

Fifth Embodiment of the Present Invention

In a fifth embodiment of the present invention, another example timing at which operating active filter devices among the active filter devices (41, 42, 43) and the combination thereof change is described.

Figure 9:
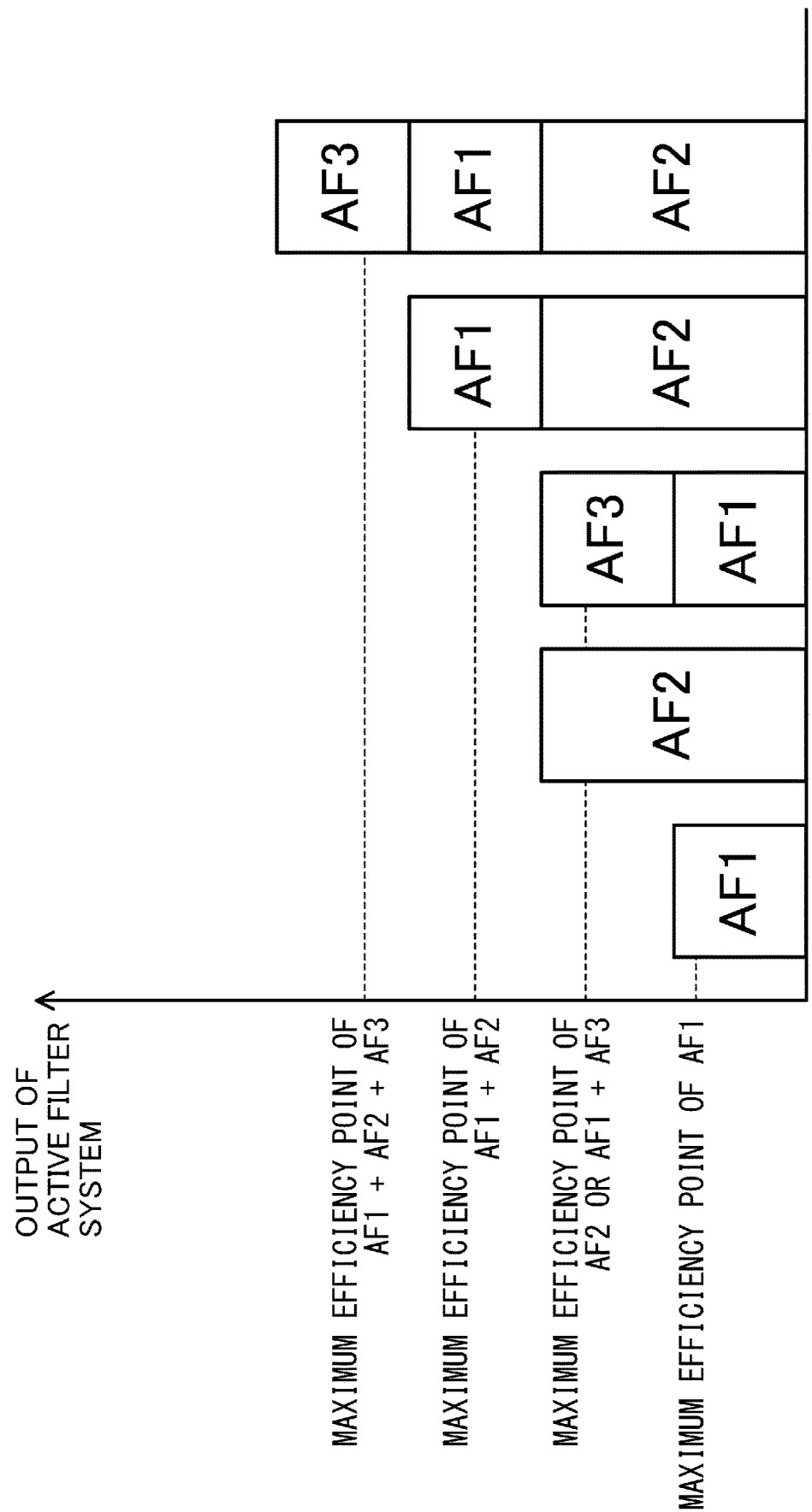
FIG. 9 illustrates example capacities of an active filter system in a fifth embodiment.
Figure 10:
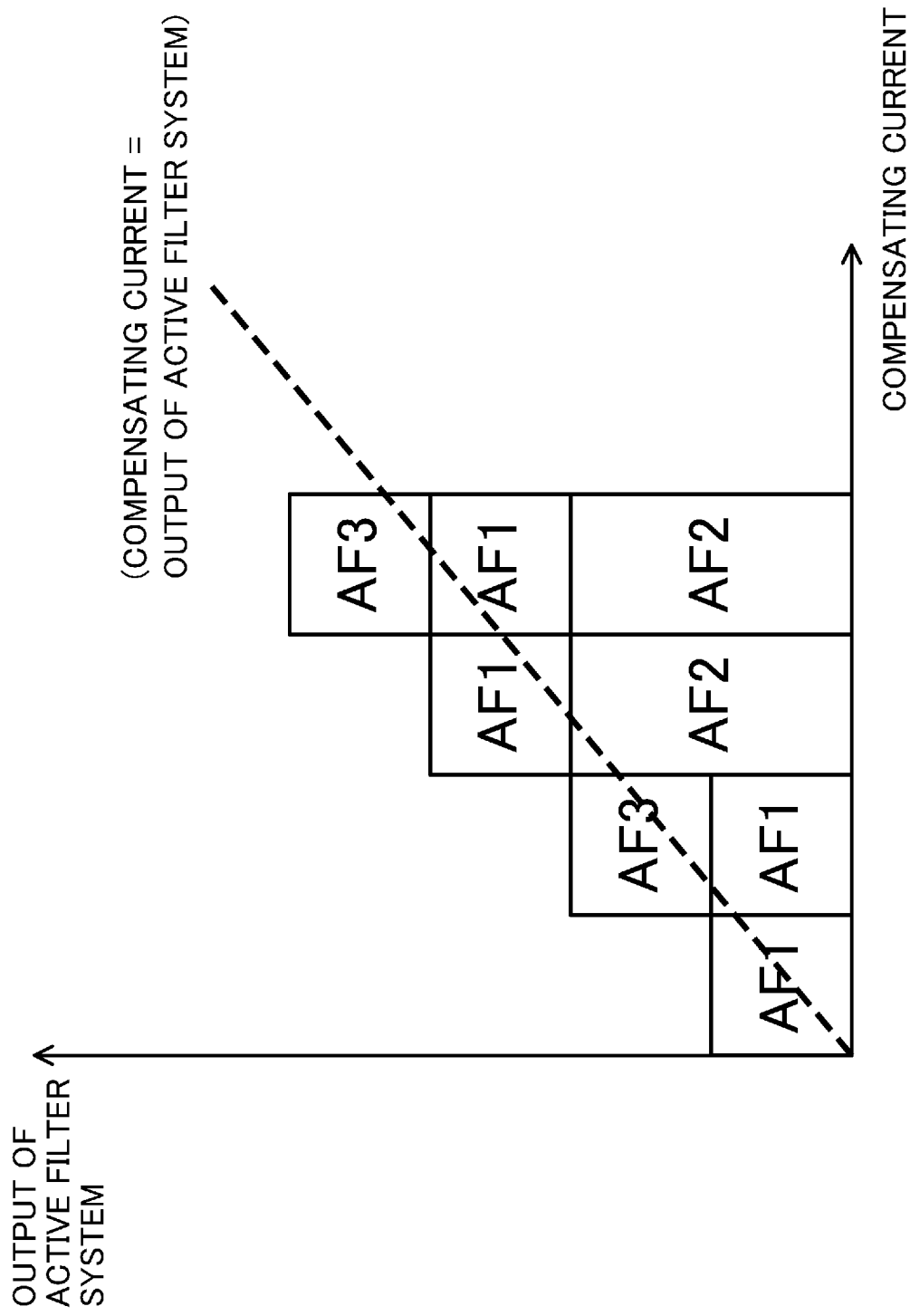
FIG. 10 illustrates example combinations of active filter devices in the fifth embodiment.

FIG. 1 illustrates total capacities that can be provided by all combinations in a case where the three active filter devices that provide two types of capacities are used. FIG. 9 illustrates, for each of the total capacities, a point at which the efficiency of the one or more active filter devices reaches the maximum. In this example, the efficiency reaches the maximum at an output of about 80% of the maximum output of the one or more active filter devices. In a case of using such devices, the combination of active filter devices for the necessary compensating current is set by using not the capacities but the output at which the efficiency reaches the maximum. FIG. 10 illustrates example combinations of the active filter devices for the compensating current. It is found that, as the compensating current increases, the combination changes before the output of the one or more active filter devices that are in operation reaches the maximum.

Effects of this Embodiment

For the compensating current, the active filter devices that are in operation are used at an output below the maximum output, and therefore, it is possible to increase the hours of operation in an efficient state. Accordingly, it is possible to operate the active filter system in a more efficient state.

First Modification of Second Embodiment

Figure 11:
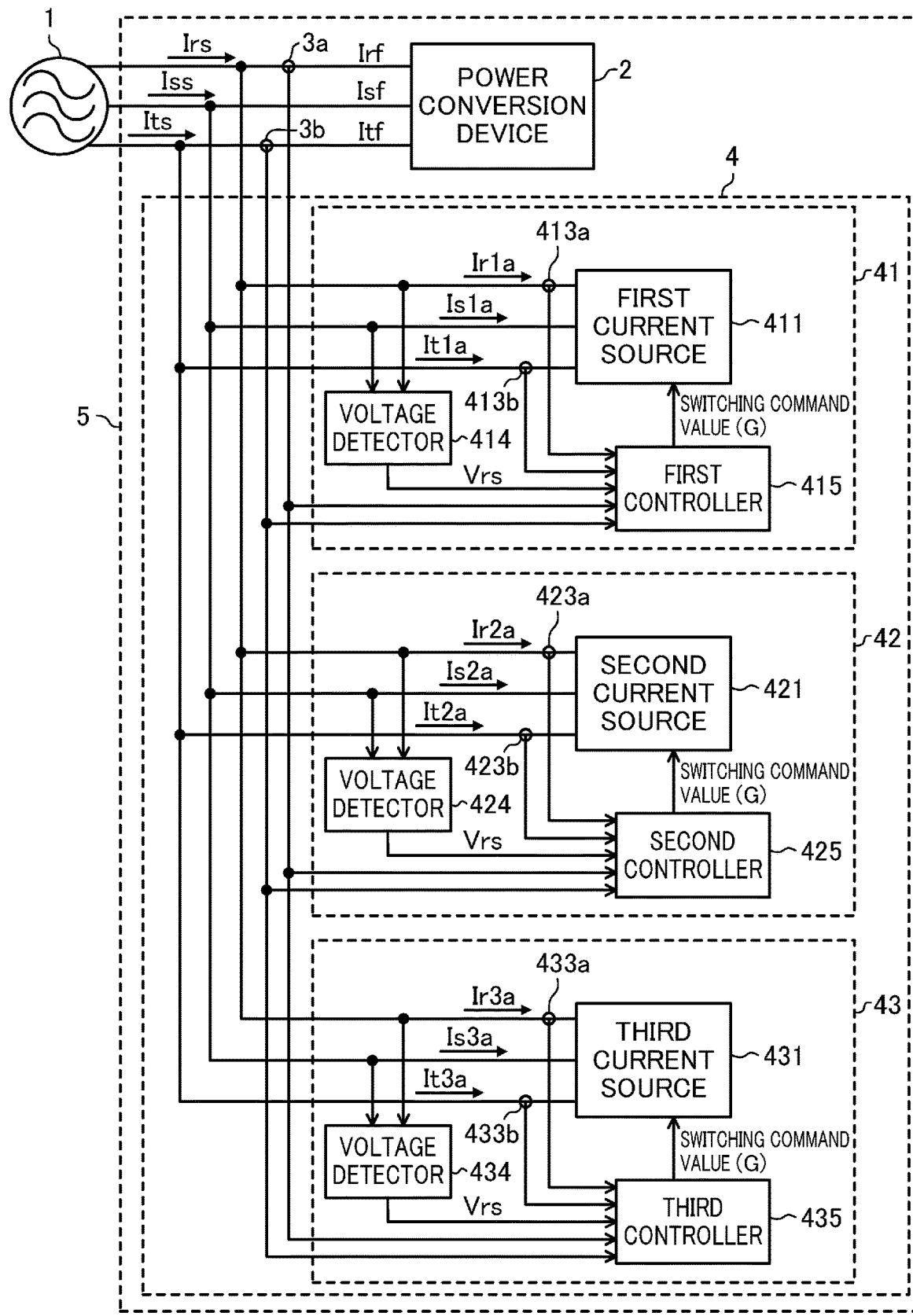
FIG. 11 is a block diagram illustrating an air conditioning device according to a first modification of the second embodiment.

In a first modification, an example where it is determined whether to operate the active filter devices (41, 42, 43) on the basis of power (P) is described. FIG. 11 is a block diagram illustrating the configuration of the air conditioning device (5) according to the first modification. In the first modification, the three active filter devices (41, 42, 43) are also configured. In the following description, a component the same as that in the second embodiment is assigned the same reference numeral and a description thereof is omitted, and only different components are described.

Figure 12:
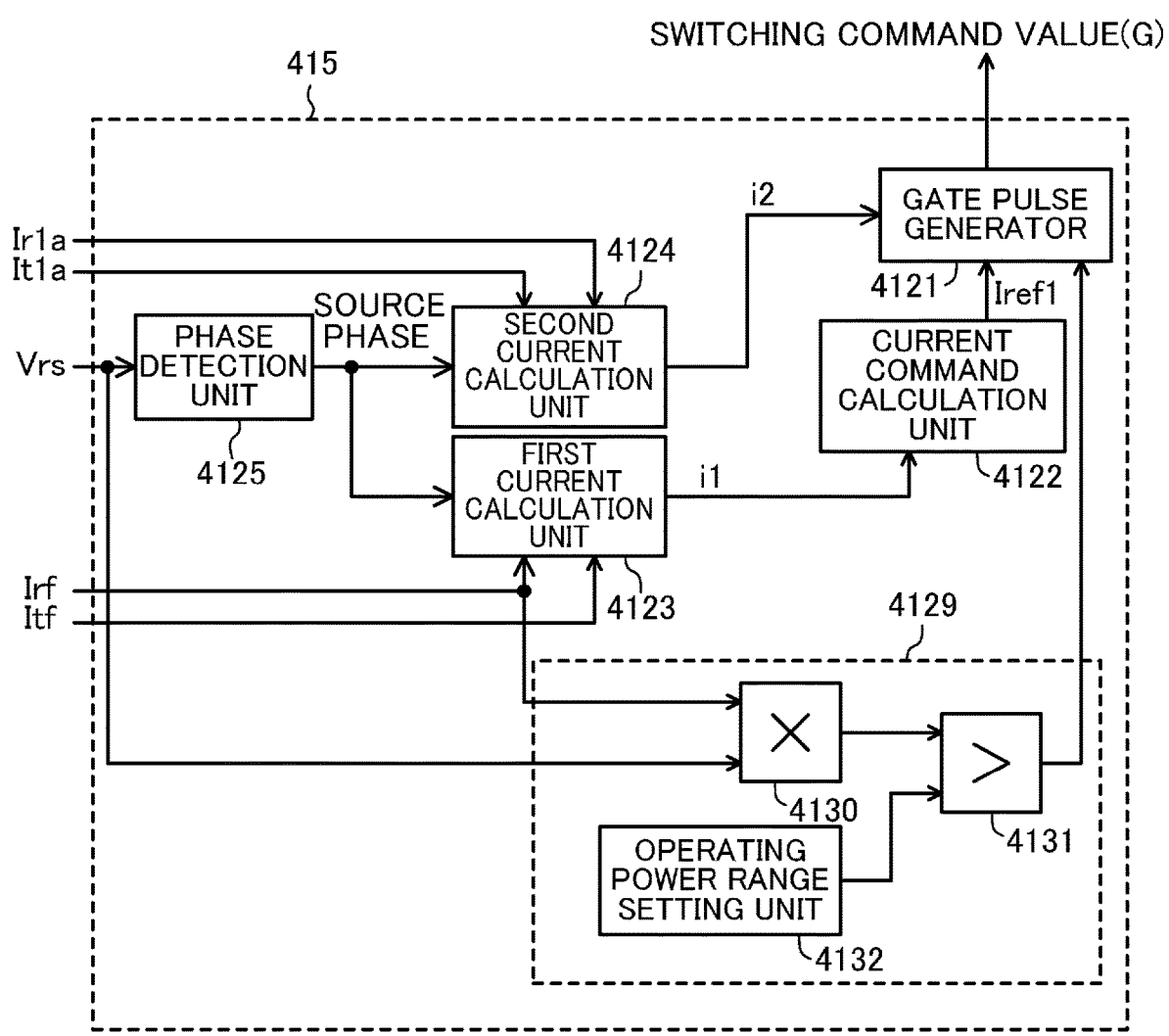
FIG. 12 is a block diagram illustrating an example configuration of a first controller according to the first modification of the second embodiment.

In the first modification, the configuration of the active filter devices (41, 42, 43) is different from that in the second embodiment. As illustrated in FIG. 11, in the active filter devices (41, 42, 43) of the first modification, the first controller (412), the second controller (422), and the third controller (432) included in the active filter devices (41, 42, 43) of the second embodiment are respectively replaced by a first controller (415), a second controller (425), and a third controller (435). FIG. 12 is a block diagram illustrating the configuration of the first controller (415) according to the first modification. In the first controller (415), an operation determination unit (4129) is provided instead of the operation determination unit (4126) included in the first controller (412) of the second embodiment.

The operation determination unit (4129) determines whether to operate the first current source (411) on the basis of the power (P) supplied to the power conversion device (2). Specifically, the operation determination unit (4129) includes a multiplier (4130), a comparator (4131), and an operating power range setting unit (4132). The multiplier (4130) multiplies the source voltage (Vrs) and the load currents (Irf, Itf) to calculate the power (P) of the power conversion device (2). In the operation determination unit (4129), an operating power range and the value of the power (P) are compared by the comparator (4131). The operating power range is set in the operating power range setting unit (4132). With this configuration, in the operation determination unit (4129), when the value of the power (P) is within the operating power range, the operation start signal (S) is output to the gate pulse generator (4121) from the comparator (4131). That is, the operation determination unit (4129) determines whether to operate the first current source (411) in accordance with the power (P) of the power conversion device (2).

Although block diagrams are not provided, the second controller and the third controller have configurations similar to that of the first controller, and the operating power ranges thereof differ as in the second embodiment in which the operating current ranges of the first controller, the second controller, and the third controller differ.

<Operations of Air Conditioning Device (5)>

With the above-described configuration, a compensating current is also output from the active filter devices (41, 42, 43), and the combination of operation and suspension of the active filter devices changes in accordance with the value of the power (P).

Effects of First Modification

In the first modification, the active filter devices (41, 42, 43) are also combined so as to maximize the ratio of the compensating current relative to the total capacity of operating active filter devices. Therefore, in the first modification, it is also possible to achieve effects similar to those achieved in the second embodiment.

Further, the first modification is effective in a case where there is a concern about a voltage drop in the AC power source (1). For example, in a case where the voltage of the AC power source (1) drops and the power conversion device (2) continues generating the power (P) the same as that before the voltage drop, the current increases in the power conversion device (2) by an amount corresponding to the voltage drop. Therefore, in a case where it is determined whether to operate the active filter devices (41, 42, 43) on the basis of the current value, there is a possibility that the second active filter device (42) is operated in a case where the compensating current can be sufficiently supplied only by the first active filter device (41). On the other hand, in the first modification, it is determined whether to operate the second current source (421) on the basis of the magnitude of the power (P) of the power conversion device (2). Therefore, even in a case where the current value of the power conversion device (2) fluctuates, it is possible to determine whether to operate the active filter devices (41, 42, 43) with certainty.

Other Embodiments

The number of active filter devices that constitute the active filter system is an example. When two or more active filter devices are used, it is possible to combine two or more types of capacities. An example as illustrated in FIG. 13 where two active filter devices are combined is possible.

The field of application of the active filter system is not limited to the air conditioning device.

The active filter devices need not include the function of improving the power factor of the fundamental wave. That is, the active filter devices may be configured to have only the function of reducing the harmonic current. The active filter devices can be configured to have only the function of improving the power factor of the fundamental wave. In this case, the active filter devices need to obtain the power factor of the fundamental wave by detecting the source current instead of the load current and to compensate for only a reactive current on the basis of the magnitude of the power factor.

There may be a case where a smart meter that transmits information about power usage and other information to an electric power company and so on may be used in a building or the like. In such a case, the smart meter may be used as a detector for detecting the source current.

INDUSTRIAL APPLICABILITY

The present invention is effective as an active filter system and an air conditioning device.

REFERENCE SIGNS LIST

1 AC power source
2 power conversion device (harmonic-generating load device)
4 active filter system
5 air conditioning device
41 first active filter device
42 second active filter device
43 third active filter device

The invention claimed is:

1. An active filter system comprising
a plurality of active filter devices that each have an output connected to a harmonic-generating load device and are capable of generating a compensating current for performing at least one of reduction of a harmonic current of the harmonic-generating load device and improvement of a power factor of a fundamental wave, wherein
each of the plurality of active filter devices has an output capacity corresponding to a maximum allowable magnitude of output power,
at least two of the active devices have different output capacities, and
selectively activating/deactivating a number and a combination of operating active filter devices among the active filter devices in accordance with a magnitude of the compensating current, wherein the number and the combination of the operating active filter devices among the active filter devices change so as to maximize a ratio of the compensating current relative to a total output capacity of the operating active filter devices among the active filter devices.

2. The active filter system according to claim 1, wherein operation of an active filter device having a large output capacity among the plurality of active filter devices gives priority over operation of an active filter device having a small output capacity among the plurality of active filter devices.

3. The active filter system according to claim 1, wherein when the compensating current exceeds or falls below a value of the compensating current corresponding to a total output capacity of any combination among all combinations for selecting one or more active filter devices from among the plurality of active filter devices, the combination of the operating active filter devices among the active filter devices changes.

4. The active filter system according to claim 1, wherein instead of output capacities of the respective active filter devices, an output at which the active filter devices reach a maximum efficiency is used.

5. The active filter system according to claim 1, wherein the harmonic-generating load device is a power conversion device.

6. An air conditioning device comprising the active filter system according to claim 1.

* * * * *